(12) United States Patent  (10) Patent No.: US 8,400,104 B2
Adamczyk et al.  (45) Date of Patent: Mar. 19, 2013

(54) GANGABLE INDUCTIVE BATTERY CHARGER

(75) Inventors: Mark Adamczyk, Social Circle, GA (US); Jason B. Turner, Joplin, MO (US)

(73) Assignee: L & P Property Management Company, South Gate, CA (US)

( * ) Notice: Subject to any disclaimer, the term of this patent is extended or adjusted under 35 U.S.C. 154(b) by 451 days.

(21) Appl. No.: 12/755,107

(22) Filed: Apr. 6, 2010

(65) Prior Publication Data

US 2011/0241608 A1 Oct. 6, 2011

(51) Int. Cl.
*H02J 7/00* (2006.01)
*H02J 7/04* (2006.01)
*H01F 21/00* (2006.01)

(52) U.S. Cl. ........ 320/108; 320/109; 320/138; 320/139; 336/137

(58) Field of Classification Search ................... 320/108
See application file for complete search history.

(56) References Cited

U.S. PATENT DOCUMENTS

| | | | |
|---|---|---|---|
| 4,739,242 A | 4/1988 | McCarty | |
| 5,900,715 A | 5/1999 | Roberts | |
| 5,947,787 A | 9/1999 | Cyrus et al. | |
| 5,959,433 A | 9/1999 | Rohde | |
| 5,963,014 A | 10/1999 | Chen | |
| 6,204,632 B1 | 3/2001 | Nierescher et al. | |
| 6,634,910 B2 | 10/2003 | Lieb et al. | |
| 6,860,764 B2 | 3/2005 | Khoury | |
| 7,057,374 B2 | 6/2006 | Freas et al. | |
| 7,408,324 B2 | 8/2008 | Baarman et al. | |
| 7,414,380 B2 | 8/2008 | Tang et al. | |
| 2006/0208697 A1 | 9/2006 | Chan | |
| 2007/0015981 A1 | 1/2007 | Benaron et al. | |
| 2007/0279002 A1 | 12/2007 | Partovi | |
| 2009/0212638 A1 | 8/2009 | Johnson | |

OTHER PUBLICATIONS

PCT ISR m. Jun. 21, 2011, 12 pp.

*Primary Examiner* — Yalkew Fantu
(74) *Attorney, Agent, or Firm* — Shook, Hardy & Bacon L.L.P.

(57) ABSTRACT

Gangable inductive battery chargers with integrated inductive coils are provided. A gangable inductive battery charger has at least one power supply module and at least one inductive charging cup module. The power supply module and the inductive charging cup module are interlockingly connectable through rail and slot mechanical connectors and an electrical connector. The inductive charging cup module has one or more charging cups that are capable of receiving a battery. A primary inductive coil embedded in the inductive charging cup module transfers power from the power supply module to a battery received by one of the one or more charging cups. The battery contains a secondary inductive coil for receiving power from the embedded primary coil. Multiple power supply and inductive charging cup modules may be interlockingly connected as needed.

20 Claims, 4 Drawing Sheets

GANGABLE INDUCTIVE BATTERY CHARGER

BACKGROUND

One of the problems associated with many of the electronics so common in today's world is the necessity for the cords and cables associated with the various electronic devices. Rechargeable cordless devices are a common alternative. These devices still require charging and associated cords and cables to accommodate this charging.

Technology has been developed to address these limitations by providing an inductively coupled power circuit. This circuit dynamically seeks resonance and optimizes power transfer from a primary coil to a secondary device with a secondary coil. This power transfer can occur under multiple, varying load conditions. By using this circuit, the primary supply circuit adapts its operation to match the needs of the secondary devices being supplied with power. The circuit also allows the primary supply circuit to supply power to multiple secondary devices simultaneously.

SUMMARY

Intelligent, inductively coupled power circuits have been developed to transfer power from a source to a device without the need for a wired connection. Primary coils inductively couple power to secondary coils integrated into devices such as power tools, laptop computers, PDAs, and mobile phone. Secondary coils can also be integrated into the batteries used by these devices. Embodiments of the present invention incorporate this inductive coupling technology into gangable inductive battery chargers.

In one embodiment, an inductive battery charger is provided. The battery charger has a power supply module and an inductive charging cup module. The power supply module and the inductive charging cup module are interlockingly connectable through rail and slot mechanical connectors and an electrical connector. The inductive charging cup module has one or more charging cups that are capable of receiving a battery or a device having a battery. A primary inductive coil embedded in the inductive charging cup module transfers power to a battery or device received by one of the one or more charging cups. The battery, or device having the battery, contains a secondary inductive coil for receiving power from the embedded primary coil.

In another embodiment, an inductive charging cup module is provided. The inductive charging cup module has one or more charging cups each capable of receiving a battery. One or more primary inductive coils are embedded in the inductive charging cup module. The embedded coils inductively transfer power to a battery containing a secondary coil when the battery is received by one of the one or more charging cups. The inductive charging cup module has a set of rail and slot mechanical connectors and an electrical connector.

In still another embodiment of the invention, an inductive battery charger is provided. The battery charger has a power supply module and one or more inductive charging cup modules. The power supply module and the inductive charging cup modules each have four pairs of rail and slot mechanical connectors and four corresponding electrical connectors. Each of the power supply module and the inductive charging cup modules are interlockingly connectable with each other through the rail and slot mechanical connectors and electrical connectors. Each inductive charging cup module has two charging cups that are each capable of receiving a battery. A primary inductive coil embedded beneath each charging cup in the inductive charging cup module transfers power to a battery received by the corresponding charging cup. The battery contains a secondary inductive coil for receiving power from the embedded primary coil.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present invention is described in detail below with reference to the attached drawing figures, wherein.

DETAILED DESCRIPTION

Embodiments of the present invention are described with specificity herein to meet statutory requirements. However, the description itself is not intended to limit the scope of this patent. Rather, the inventor has contemplated that the claimed subject matter might also be embodied in other ways.

As noted in the background section, technology has been developed that provides an intelligent, inductively coupled power circuit. This circuit dynamically seeks resonance and optimizes power transfer from a primary coil to a secondary coil contained in a device or battery. The circuit allows the primary coil to determine and provide the power needs of the device or battery. By using this circuit, the primary supply circuit adapts its operation to match the needs of the device or battery. The circuit also allows the primary supply circuit to transfer power to multiple secondary coils simultaneously. Examples of the circuit and the operation of the circuit are contained in the following U.S. Patents, all of which are hereby incorporated by reference: U.S. Pat. Nos. 6,436,299; 6,673,250; 6,731,071; 6,806,649; 6,812,645; 6,831,417; 6,917,163; 6,975,198; 7,116,200; 7,118,240; 7,126,450; and 7,132,918.

The primary coils necessary to form an inductively coupled power circuit as described above may be integrated into battery chargers such that power is transferred from one or more primary coils in the battery charger to one or more secondary coils integrated into rechargeable batteries that power secondary devices such as power tools. Inductive battery chargers with integrated primary coils may be "gangable." As used herein, gangable is defined as including multiple modules that may be connected together. Gangable inductive battery chargers may include additional modules as needed, limited by the sourcing ability of the power supply. In some embodiments, multiple power supply modules are connected to the gangable battery charger to provide additional supply power. For example, a gangable inductive battery charger may include a power supply module interlockingly connected to a first inductive charging cup module containing a primary inductive coil. A second inductive charging cup module containing one or more primary inductive coils may be interlockingly connected to the first inductive charging cup module, and so on.

Figure 1:
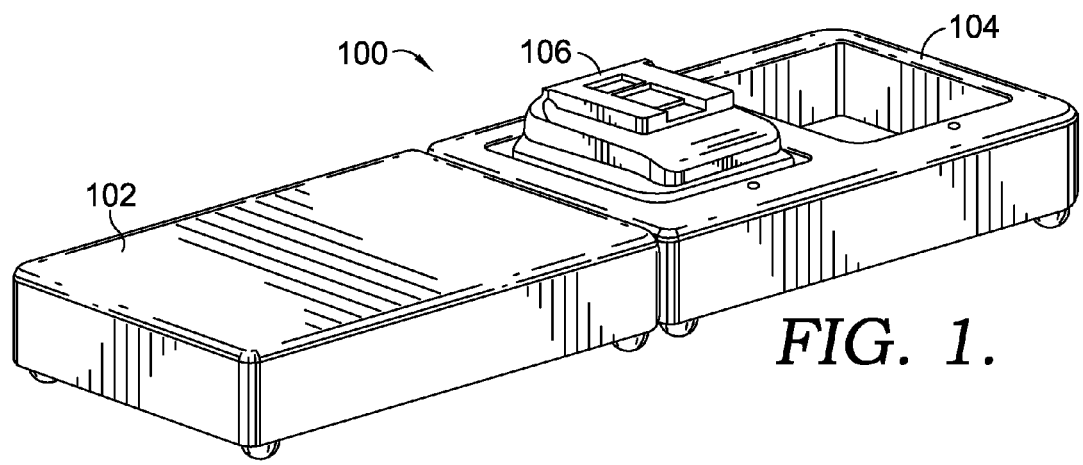
FIG. 1 is a perspective view of an inductive battery charger in accordance with an embodiment of the present invention.

FIG. 1 illustrates an inductive battery charger 100. Inductive battery charger 100 includes power supply module 102 and inductive charging cup module 104. Inductive charging cup module 104 is shown with a received battery 106. Power supply module 102 and charging cup module 104 are interlockingly connected via a set of rail and slot mechanical connectors and an electrical connector. Power supply module 102 and inductive charging cup module 104 are shown disconnected in FIGS. 2a and 2b for clarity.

Figure 2A:
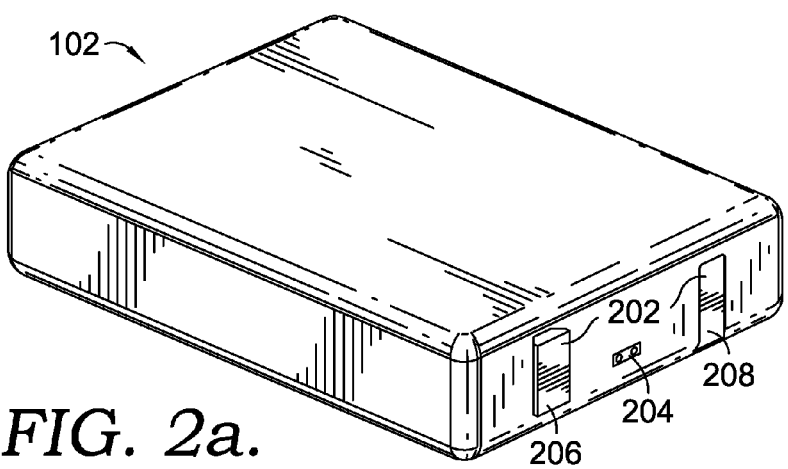
FIG. 2a is a perspective view of a power supply module of an inductive battery charger in accordance with an embodiment of the present invention.
Figure 2B:
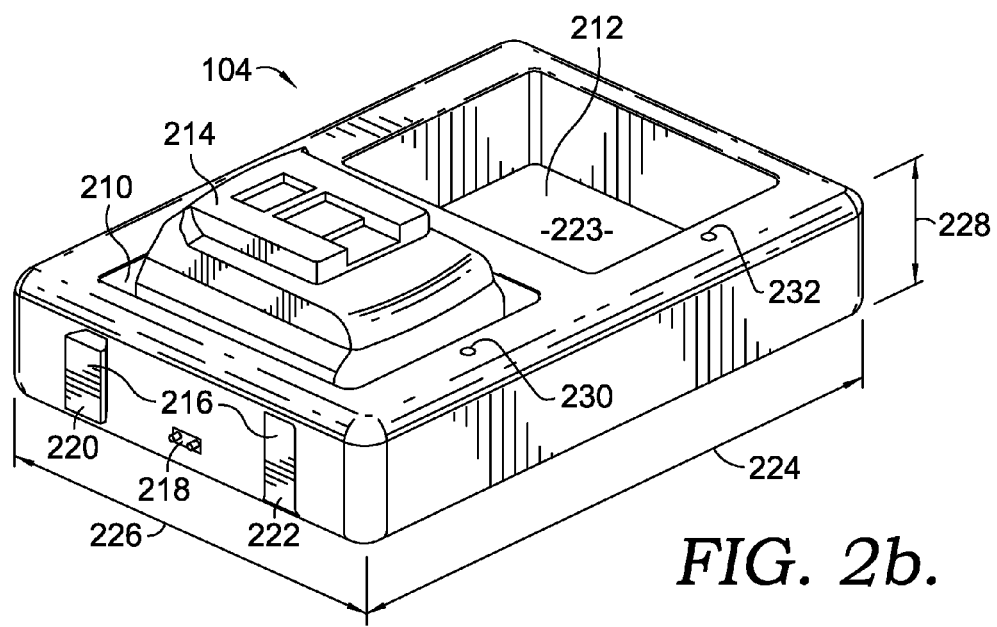
FIG. 2b is a perspective view of an inductive charging cup module of an inductive battery charger in accordance with an embodiment of the present invention

With reference now to FIGS. 2a and 2b, power supply module 102 provides power for the inductive battery charger. In some embodiments, power supply module 102 receives power from an alternating current source. For example, power supply module 102 may be plugged into an electrical outlet connected to a power grid. (No plugs or cords are shown in the figures to emphasize the other features of the inductive battery chargers shown.) In other embodiments, power supply module 102 contains a secondary inductive coil to inductively receive power transferred from an external primary coil. An external primary coil could be located in, for example, a work surface, shelf, or toolbox. In such embodiments, power supply module 102 is placed on the work surface, shelf, or toolbox containing the primary coil and inductively receives power via the secondary inductive coil. Power is then transferred from power supply module 102 to any attached charging cup modules.

Power supply module 102 is interlockingly connectable with an inductive charging cup module by a pair of rail and slot mechanical connectors 202 and an electrical connector 204. The pair of rail and slot mechanical connectors 202 includes rail 206 and slot 208. Rail 206 extends from power supply module 102, the rail becoming wider as it extends. Slot 208 is capable of slidably receiving a rail. Electrical connector 204 may have a variety of shapes or structures. In FIG. 2a, electrical connector 204 is shown as two conductive sheaths capable of receiving two conductive prongs from an inductive charging cup module.

FIG. 2b shows inductive charging cup module 104 of FIG. 1. Inductive charging cup module 104 includes charging cups 210 and 212. Two charging cups are shown in FIG. 2b, but other embodiments may have only one charging cup, three charging cups, or any other number of charging cups. The number of charging cups may be limited by the amount of power that power supply module 102 of FIG. 2a is able to supply. In some embodiments, power supply module 102 supplies up to approximately 600 watts of power.

Charging cups 210 and 212 are capable of receiving a battery such as battery 214. Battery 214 may provide power to a power tool such as a cordless drill or screwdriver. One or more primary inductive coils (not shown) are embedded in inductive charging cup module 104. In some embodiments, one primary inductive coil is embedded beneath each charging cup. In other embodiments, one primary inductive coil is embedded beneath multiple charging cups. The one or more embedded primary inductive coils transfer power to a secondary coil integrated with battery 214. In some embodiments, each primary coil is able to transfer approximately up to 100 watts of power. Primary coils with other power-sourcing capabilities are contemplated.

Inductive charging cup module 104 has a pair of rail and slot mechanical connectors 216 and an electrical connector 218. The pair of rail and slot mechanical connectors 216 includes rail 220 and slot 222. Rail 220 extends from inductive charging cup module 104, becoming wider as it extends. Slot 222 is capable of slidably receiving a rail. Rail and slot mechanical connector pair 216 and electrical connector 218 are interlockingly connectable with rail and slot mechanical connector pair 202 and electrical connector 204 of power supply module 102 in FIG. 2a. Rail 206 of power supply module 102 slidably connects with slot 222 of inductive charging cup module 104, and rail 220 of inductive charging cup module 104 slidably connects with slot 208 of power supply module 102.

Slots 208 and 222 may be configured such that rails 220 and 206 are able to slidably connect from only above or below or from both above and below. For example, in FIG. 2b, slot 222 is configured such that a rail being slidably received by slot 222 slides from below inductive charging cup module 104. In some embodiments, slot 208 of power supply module 102 and slot 222 of inductive charging cup module 104 are configured in an opposite manner such that slot 208 slidably receives a rail from above and slot 222 slidably receives a rail from below. In this way, power supply module 102 and inductive charging cup module 104 are designed to interlock with each other.

Electrical connector 218 may have a variety of shapes or structures. In FIG. 2b, electrical connector 218 is shown as two conductive prongs capable of being received by the two conductive sheaths of power supply module 102 in FIG. 2a. The two prongs of electrical connector 218 may be rigid or may be spring mounted to allow the modules to be mechanically interlocked close together. In such an embodiment, electrical connector 218 is forced backward into inductive charging cup module 104 while the two modules are being interlocked, and, when the modules are in proper position, the two conductive sheaths of electrical connector 204 of FIG. 2a allow the prongs of electrical connector 218 to extend and create an electrical connection between the two modules.

A power source in power supply module 102 is electrically connected to electrical connector 204. Similarly, electrical connector 218 is electrically connected to the one or more primary inductive coils embedded in inductive charging module 104. In this way, when electrical connector 204 and electrical connector 218 are brought into contact when power supply module 102 is interlockingly connected with inductive cup charging module 104, a continuous electrical path is formed connecting a power source in power supply module 102 with the one or more embedded primary inductive coils in inductive cup charging module 104.

As discussed above, in the inductive power transfer technology used by embodiments of the present invention, the primary supply circuit adapts its operation to match the needs of the batteries being supplied with power. This allows power supply module 102 to supply power to batteries of different voltage, supply current, and composition (such as nickel cadmium, nickel-metal hydride, or lithium ion).

Figure 5:
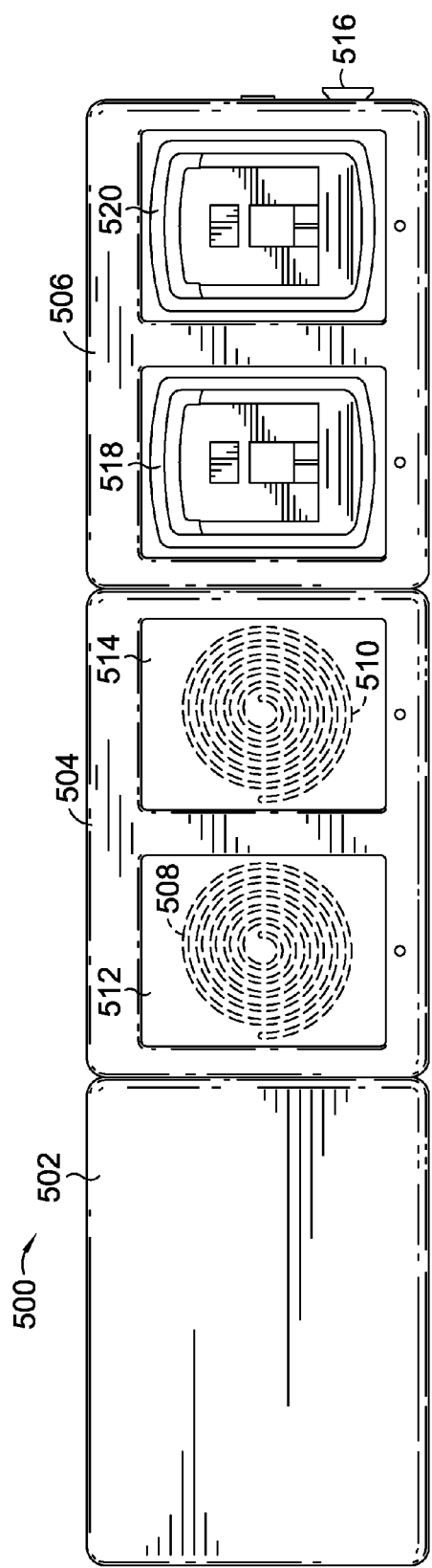
FIG. 5 is an elevated plan view of an inductive battery charger having two inductive charging cup modules in accordance with an embodiment of the present invention.
Figure 6:
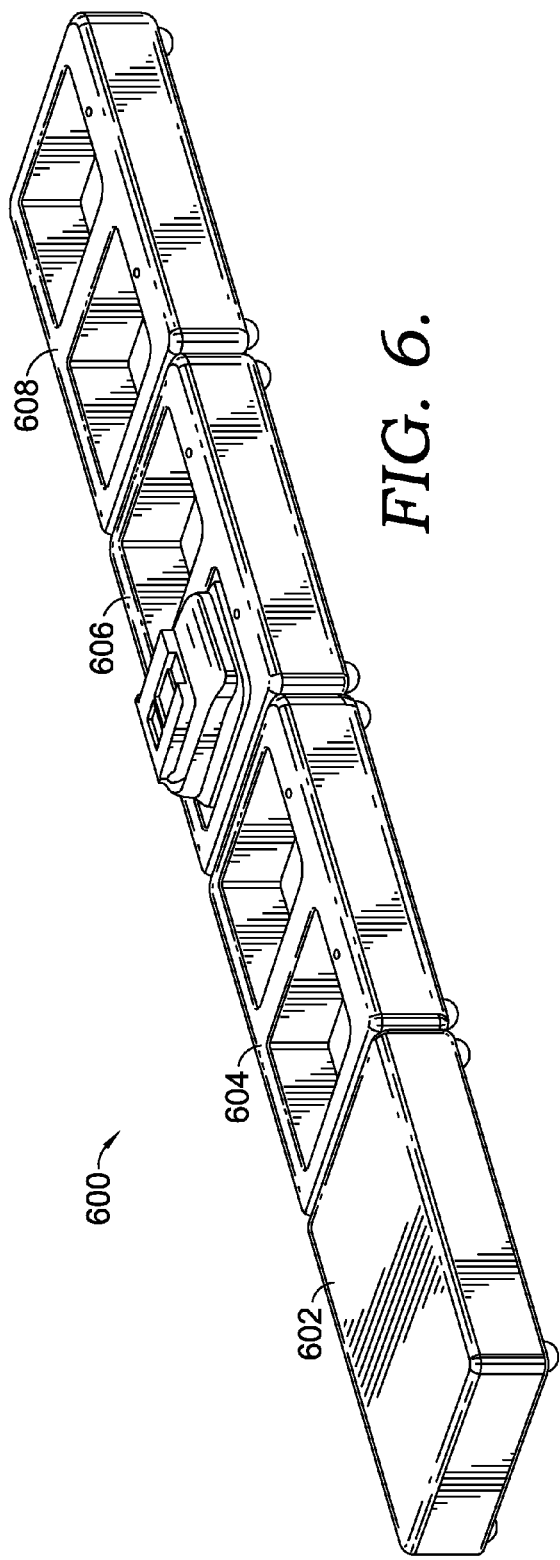
FIG. 6 is a perspective view of an inductive battery charger having three inductive charging cup modules in accordance with an embodiment of the present invention.
Figure 7:
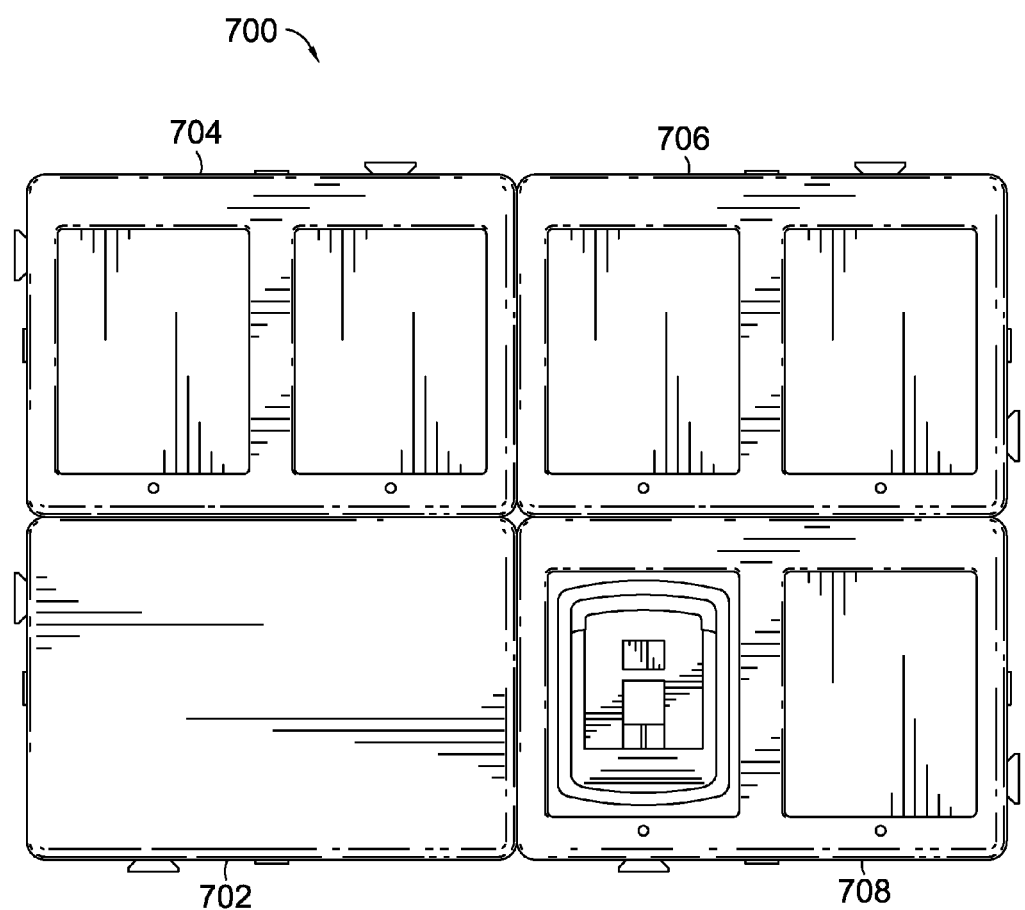
FIG. 7 is an elevated plan view of an inductive battery charger in a "charging mat" configuration, the charger having a power supply interlockingly connected with three inductive charging cup modules to form the charging mat in accordance with an embodiment of the present invention.

In some embodiments, inductive charging cup module 104 includes one or more additional pairs of rail and slot mechanical connectors and one or more additional electrical connectors. The additional connectors allow additional inductive charging cup modules to be interlockingly connected to inductive charging cup module 104 in a similar manner as inductive charging cup module 104 is interlockingly connectable to power supply module 102. In some embodiments, the additional connectors are located on the opposite side of inductive charging cup module 104 from power supply module 102 such that when an additional inductive charging cup module is connected to inductive charging cup module 104, power supply module 102 and both inductive charging cup modules extend in the same direction. This is illustrated in FIGS. 5 and 6, discussed below. In other embodiments, the additional connectors may be located elsewhere such that one or more power supply modules are interlockingly connected with one or more inductive charging cup modules in a substantially rectangular configuration, as shown in FIG. 7, discussed below.

In some embodiments, power supply module 102 of FIG. 2a is approximately the same size as inductive charging cup module 104 of FIG. 2b. In one embodiment, inductive charging cup module 104 of FIG. 2b has a length 224 of approximately six inches, a width 226 of approximately five inches, and a height 228 of approximately two inches. In other embodiments, the size of the power supply module and corresponding inductive charging modules have different relative sizes. In still other embodiments, there is no clearly discernable relationship between the size of a power supply module and corresponding inductive charging modules.

Charging cup 212 of inductive charging cup module 104 of FIG. 2b has a substantially rectangular base 223. The receiving volume of charging cup 212 is a substantially rectangular solid void. In other embodiments, both base 223 of charging cup 212 and the receiving volume of charging cup 212 have different geometry. Base and receiving volume geometry may be selected to correspond to the geometry of batteries that may be charged by the charger, such as battery 214. In one embodiment, charging cup 212 is able to accommodate a battery measuring approximately three inches in width and approximately four and one-half inches in length.

In some embodiments, charging indicator lights 230 and 232 are included in inductive charging cup module 104. Charging light 230 illuminates when battery 214, received by charging cup 210, inductively receives power from the one or more primary inductive coils embedded in inductive charging cup module 104. Similarly, charging light 232 illuminates when a battery or device received by charging cup 212 inductively receives power from the one or more primary inductive coils embedded in inductive charging cup module 104. In other embodiments, power supply module 102 includes a charging indicator light (not shown) that illuminates when any attached inductive charging cup module inductively transfers power to a device or battery. In some embodiments, a plurality of charging indicator lights is included. In such embodiments, one indicator light is illuminated for each battery or device inductively receiving power from an attached inductive cup charging module. In other embodiments, one illuminated light indicates that one inductive cup charging module is inductively transferring power, regardless of the number of devices to which power is transferred.

Figure 3:
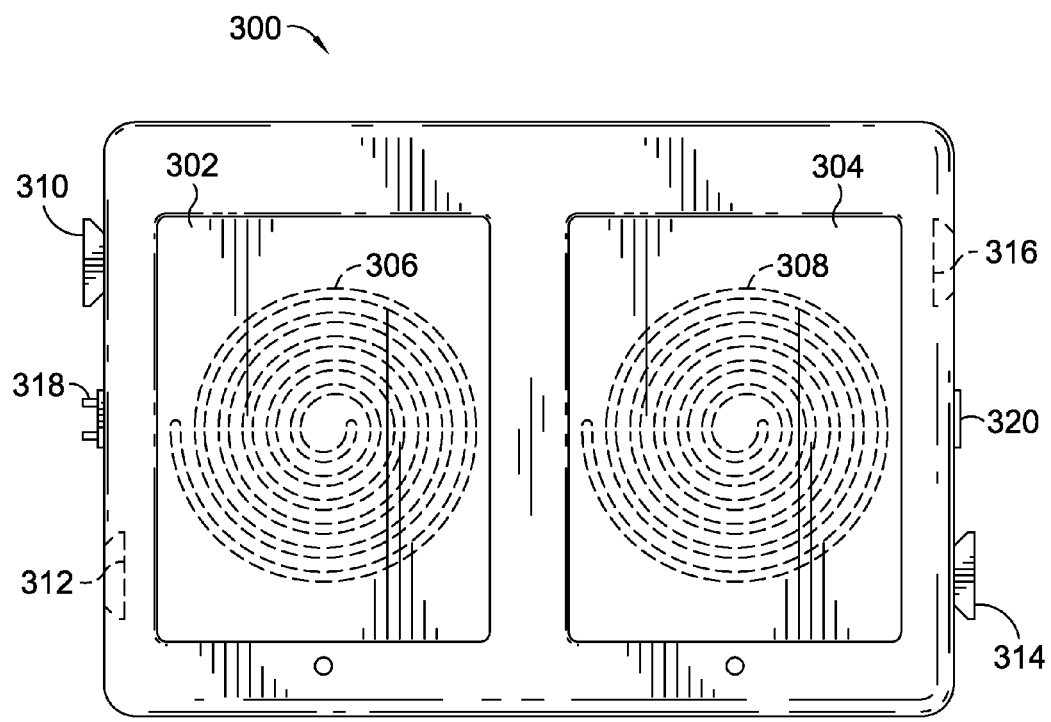
FIG. 3 is an elevated plan view of an inductive charging cup module in accordance with an embodiment of the present invention.

FIG. 3 is an elevated plan view of an inductive charging cup module 300 having two charging cups 302 and 304. Primary inductive coils 306 and 308 are embedded in inductive charging cup module 300 beneath charging cups 302 and 304, respectively. Primary inductive coils 306 and 308 inductively transfer power to batteries received by charging cups 302 and 304.

Inductive charging cup module 300 includes rail 310 and slot 312 as well as rail 314 and slot 316 for mechanically connecting inductive charging module 300 with one or more power supply modules and/or one or more additional inductive charging cup modules. Inductive charging cup module 300 also includes electrical connectors 318 and 320 for electrically connecting inductive charging module 300 with one or more power supply modules and/or one or more additional inductive charging cup modules. Inductive charging cup module 300 is thus gangable and can be interlockingly connectable with multiple additional modules to form a gangable inductive battery charger. Slots 312 and 316 are shaped to slidably receive rails shaped similarly to rails 310 and 314. Rails 310 and 314 have an approximately trapezoidal cross section. Other rail geometries and corresponding slot geometries are contemplated.

Figure 4:
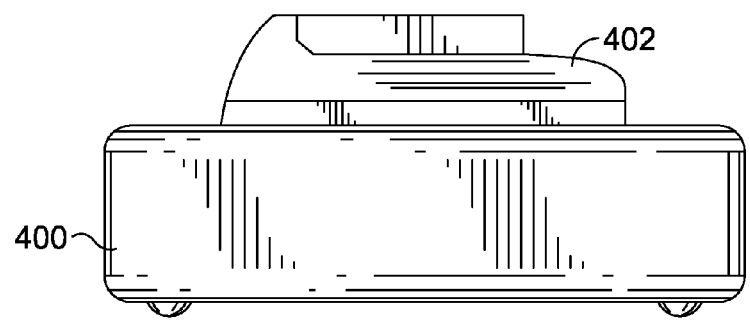
FIG. 4 is a side plan view of an inductive charging cup module in accordance with an embodiment of the present invention.

FIG. 4 is a side plan view of inductive charging cup module 400 with received battery 402. In this embodiment, inductive charging cup module 400 has rail and slot mechanical connectors and an electrical connector on only one side (not visible from this view). Inductive charging cup module 400 is an "end" module that may be used as the last module interlockingly connected in a gangable inductive battery charger. Including an end module provides a "cleaner" visual appearance than including an inductive charging cup module with mechanical and electrical connectors not being used for connection. Similarly, in some embodiments, the power supply module only has one set of rail and slot mechanical connectors and one electrical connector to provide a "clean" visual appearance. When an end module is included in the battery charger, the charger may still be expanded by inserting an additional inductive charging cup module or power supply between the end module and other modules.

FIG. 5 is an elevated plan view of a gangable inductive battery charger 500. Power supply module 502 is interlockingly connected to inductive charging cup module 504 via rail and slot mechanical connectors and an electrical connector. Primary inductive coils 508 and 510 (coil outline shown by dotted lines) are embedded beneath charging cups 512 and 514. Inductive charging cup module 504 is interlockingly connected to inductive charging cup module 506 via rail and slot mechanical connectors and an electrical connector. As shown in FIG. 5, inductive charging cup module 506 is not an "end" module. Inductive charging cup module 506 includes an additional set of rail and slot mechanical connectors and an additional electrical connector to allow additional modules to be added to gangable inductive battery charger 500. Rail 516 is visible in this view. Batteries 518 and 520 are shown received by inductive charging cup module 506. A power source in power supply module 502 is electrically connected with primary inductive coils 508 and 510 of inductive charging cup module 504 as well as with one or more primary inductive charging coils embedded in inductive charging cup module 506.

FIG. 6 shows a gangable inductive battery charger 600 including a power supply module 602 and three inductive charging cup modules 604, 606, and 608, interlockingly connected.

FIG. 7 illustrates a gangable inductive battery charger 700 in a rectangular "charging mat" configuration. Battery charger 700 includes power supply module 702 and three inductive charging cup modules 704, 706, and 708. In some embodiments, power supply module 702 receives power from an AC power source through a power cord and plug (not shown). Power supply module 702 and inductive charging cup modules 704, 706, and 708 are substantially the same size and each have a set of rail and slot mechanical connectors on each of four sides of each module such that the modules are interlockingly connectable in a variety of configurations.

Additional power supply modules or inductive charging modules may be interlockingly connected with any available set of rail and slot mechanical connectors and corresponding electrical connector. In this way, any number of additional inductive charging modules may be added in any desired configuration. For example, additional inductive charging modules and/or power supply modules may be added to form a 3-by-3 module charging mat. The charging mat need not be symmetrical. For example, one additional inductive charging module may be interlockingly connected to charging module 704. Additional power supply modules may also be interlockingly connected to battery charger 700. In some embodiments, power supply 702 can supply approximately 600 watts of power and can supply power to up to three inductive charging modules. In other embodiments, power supply 702 supplies greater than 600 watts of power and can supply power to a correspondingly larger number of inductive charging modules.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. An inductive battery charger, comprising:
a power supply module having at least one pair of rail and slot mechanical connectors and at least one electrical connector, the set of rail and slot mechanical connectors including:
a rail extending from the power supply module, the rail becoming wider as it extends from the power supply module, and
a slot capable of slidably receiving a rail;
a first inductive charging cup module having one or more charging cups each capable of receiving a battery, the first inductive charging cup module having a first pair of rail and slot mechanical connectors and a first electrical connector interlockingly connectable with the pair of rail and slot mechanical connectors and the electrical connector of the power supply module such that the rail of the power supply module slidably connects with the slot of the first pair and the rail of the first pair slidably connects with the slot of the power supply module, the first pair including:
a rail extending from the first inductive charging cup module, the rail becoming wider as it extends from the first inductive charging cup module, and
a slot capable of slidably receiving a rail; and
one or more inductive coils embedded in the first inductive charging cup module that inductively transfer power to a battery received by one of the one or more charging cups.

2. The inductive battery charger of claim 1, wherein the power supply module receives power from an alternating current power source.

3. The inductive battery charger of claim 1, wherein the charger is capable of charging batteries of different supply voltage, supply current, and composition.

4. The inductive battery charger of claim 1, wherein the first inductive charging cup module includes one or more additional pairs of rail and slot mechanical connectors and one or more additional electrical connectors.

5. The inductive battery charger of claim 4, further comprising one or more additional inductive charging cup modules each having at least one pair of rail and slot mechanical connectors and one electrical connector, each additional inductive charging cup module being interlockingly connectable with the one or more additional pairs of rail and slot mechanical connectors and the electrical connector of the first inductive charging cup module.

6. The inductive battery charger of claim 1, wherein the power supply module is substantially the same size as the first inductive charging cup module.

7. The inductive battery charger of claim 6, wherein the first inductive charging cup module measures approximately six inches by five inches by two inches.

8. The inductive battery charger of claim 1, further comprising:
an inductive coil embedded in the power supply module that inductively receives power transferred from an external inductive coil.

9. The inductive battery charger of claim 8, wherein the power supply module supplies approximately 600 watts of power.

10. The inductive battery charger of claim 1, wherein the first inductive charging cup module has two charging cups.

11. The inductive battery charger of claim 10, wherein each of the two charging cups of the first inductive charging cup module has a substantially rectangular base.

12. The inductive battery charger of claim 10, wherein an inductive coil is embedded beneath each of the two charging cups of the first inductive charging cup module.

13. An inductive charging cup module, comprising:
one or more charging cups each capable of receiving a battery;
one or more inductive coils embedded in the inductive charging cup module that inductively transfer power to a battery received by one or the one or more charging cups;
a set of rail and slot mechanical connectors, including:
a rail extending from the inductive charging cup module, the rail becoming wider as it extends from the inductive charging cup module, and
a slot capable of slidably receiving a rail; and
an electrical connector capable of receiving or transferring electrical current.

14. The inductive charging cup module of claim 13, wherein one inductive coil is embedded beneath each charging cup.

15. The inductive charging cup module of claim 13, further comprising three additional rail and slot mechanical connectors and three additional electrical connectors.

16. The inductive charging cup module of claim 15, wherein each set of rail and slot mechanical connectors is on a different side of the charging cup module.

17. The inductive charging cup module of claim 13, wherein the inductive charging cup module has two charging cups.

18. The inductive battery charger of claim 17, wherein each of the two charging cups of the inductive charging cup module has a substantially rectangular base.

19. An inductive battery charger, comprising:
- a power supply module having four pairs of rail and slot mechanical connectors and four corresponding electrical connectors, each set of rail and slot mechanical connectors including:
  - a rail extending from the power supply module, the rail becoming wider as it extends from the power supply module, and
  - a slot capable of slidably receiving a rail;
- one or more inductive charging cup modules, each inductive charging cup module having two charging cups each capable of receiving a battery, four pairs of rail and slot mechanical connectors, and four corresponding electrical connectors, and each inductive charging cup module being interlockingly connectable with the power supply module via one of the four pairs of rail and slot mechanical connectors and the corresponding electrical connector of the power supply module and being interlockingly connectable with every other inductive charging cup module, the four pairs of mechanical connectors on each of the one or more inductive charging cup modules each including:
  - a rail extending from the inductive charging cup module, the rail becoming wider as it extends from the inductive charging cup module, and
  - a slot capable of slidably receiving a rail; and
- an inductive coil embedded beneath each charging cup in each of the one or more inductive charging cup modules, each inductive coil capable of transferring power to a battery received by the corresponding charging cup.

20. The inductive battery charger of claim 19,
- wherein the power supply module and each inductive charging cup module are substantially the same size, and
- wherein from an elevated plan view, the power supply module and each inductive charging cup module are substantially rectangular with one set of rail and slot mechanical connectors visible on each of the four sides of each substantially rectangular module.

* * * * *